Feb. 7, 1961 D. P. GOVONI 2,970,672
APPARATUS FOR HANDLING PACKAGES
Filed May 13, 1959 2 Sheets-Sheet 1
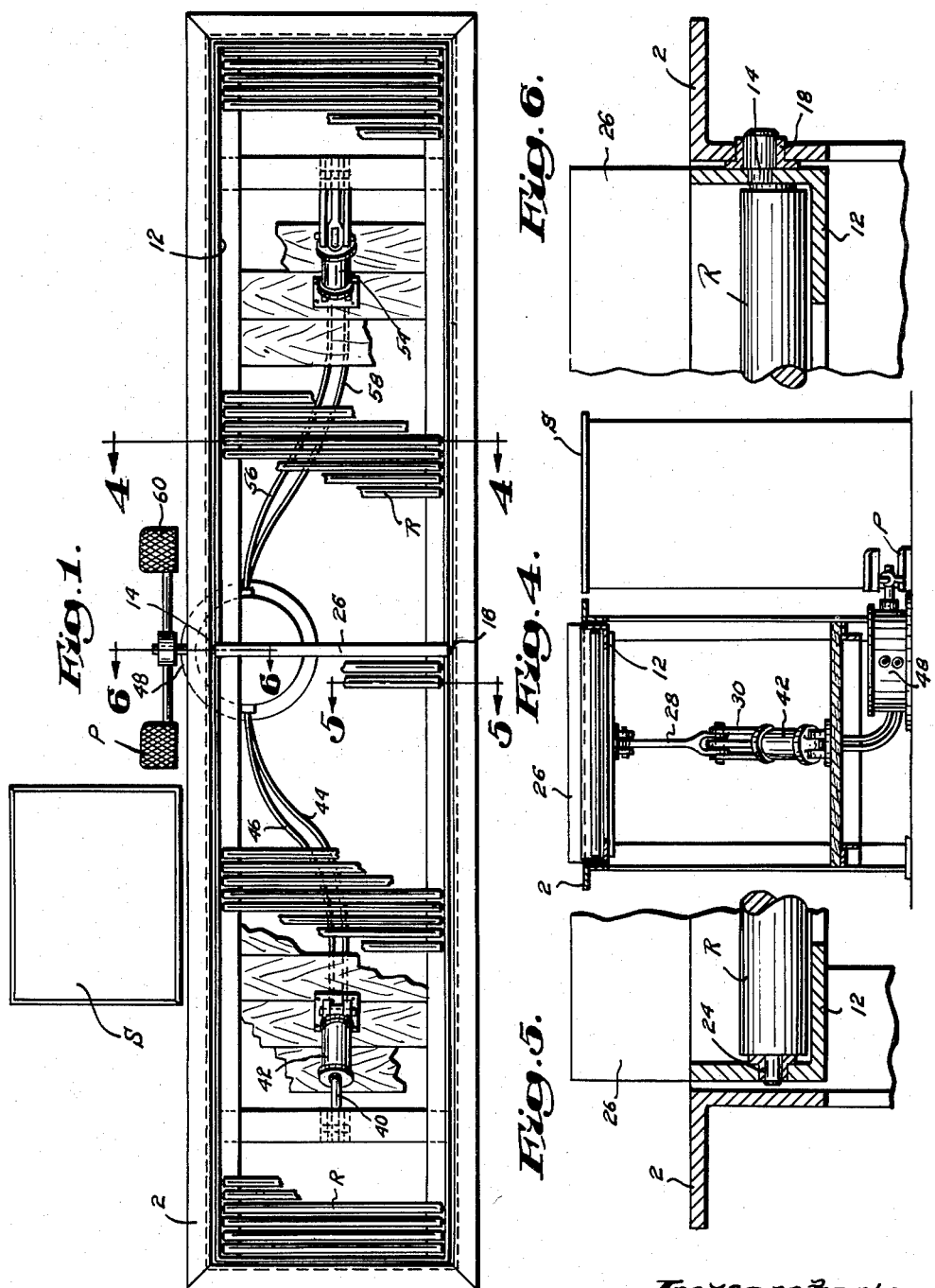
Inventor:
Douglas P. Govoni,
by Manus V. Hamilton
Attorney Feb. 7, 1961　　　　　　　D. P. GOVONI　　　　　　2,970,672
APPARATUS FOR HANDLING PACKAGES
Filed May 13, 1959　　　　　　　　　　　　　　　2 Sheets-Sheet 2
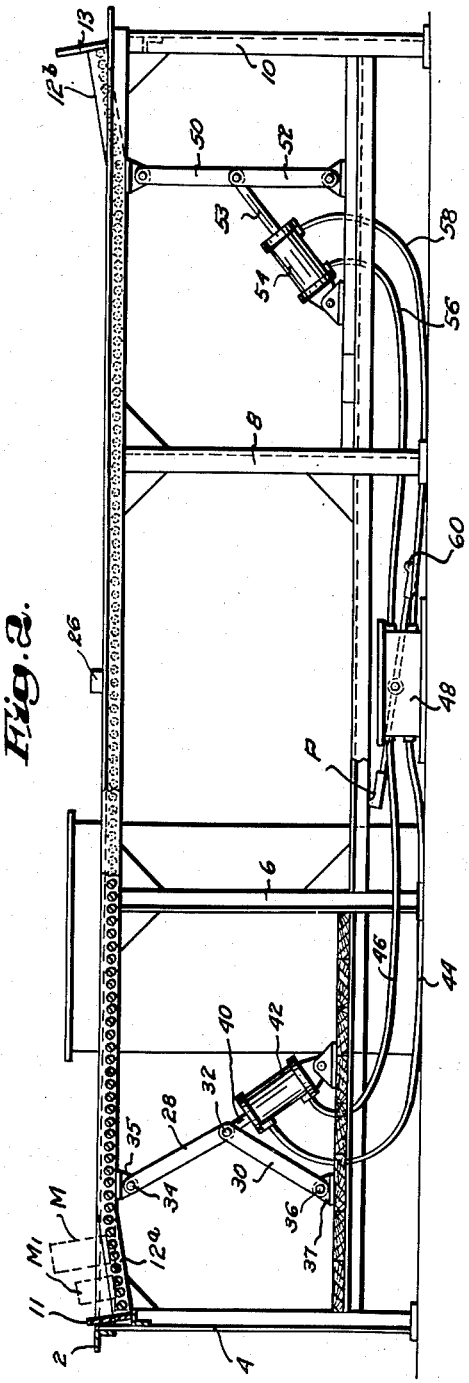
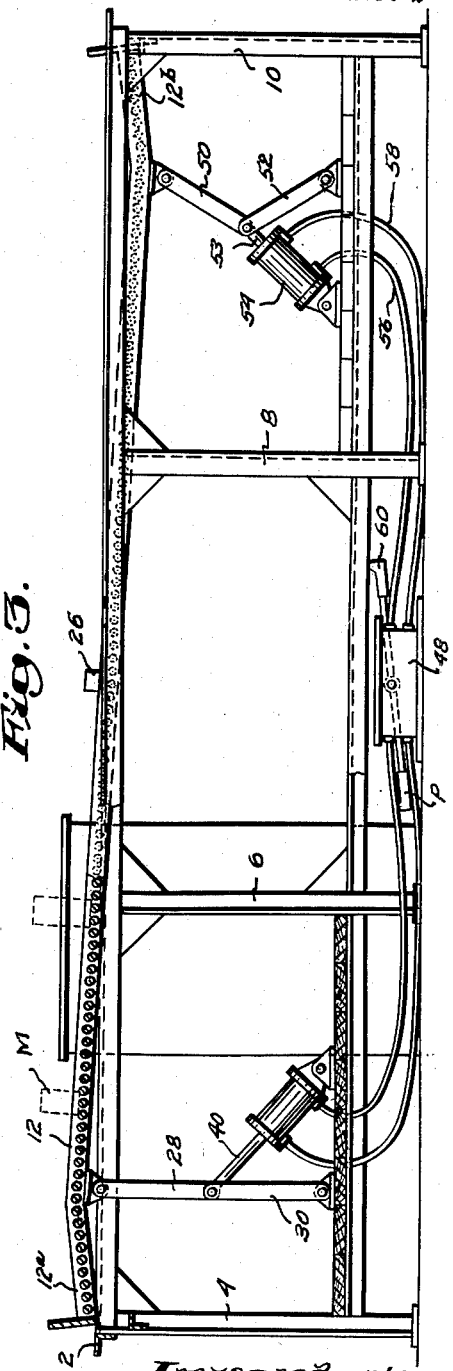
Inventor:
Douglas P. Govoni,
by Thomas T. Hamilton
Attorney

United States Patent Office 2,970,672
Patented Feb. 7, 1961

2,970,672
APPARATUS FOR HANDLING PACKAGES

Douglas P. Govoni, 317 Cabot St., Beverly, Mass.

Filed May 13, 1959, Ser. No. 812,919

7 Claims. (Cl. 186—1)

This invention relates to a method and apparatus for "checking out" self-service merchandising items of the general class offered for sale in supermarkets, grocery stores, and the like. Reference is had particularly to the type of self-service checking-out system wherein a customer brings items to a checking-out station, at which point the items are noted on a cash register by a supermarket employee and, thereafter, the items are picked up and placed in a position to be moved to a bagging station.

It is a chief object of the invention to improve methods and apparatus for checking out self-service items of merchandise of the class commonly sold in supermarkets, and to devise gravity responsive roller type conveyor mechanism for moving self-service items in a controlled manner from that point at which a customer deposits the items to a barrier or stop adjacent to the checking station where the checker notes the amount of the item on a cash register.

Another object of the invention is to devise a gravity responsive roller conveyor of simplified construction which is under the control of the checker at the register station and which can be selectively operated by the checker with the aid of a foot pedal and associated mechanical linkage to start or stop gravity induced motion.

Still another object is to combine, in a gravity responsive roll conveyor, means capable of not only moving articles of merchandise to the checking station, but also serving to carry the articles away from the checking station to a bagging station while, at the same time, avoiding the need for use of a hand operated clearing bar or other electrical apparatus for advancing items to the bagging station.

These and other objects and novel features will be more fully understood and appreciated from the following description of preferred embodiments of the invention selected for purposes of illustration and shown in the accompanying drawings, in which:

Fig. 1 is a plan view of the conveyor mechanism of the invention, also illustrating a checking station arranged at one side of the conveyor mechanism in one typical operating position;

Fig. 2 is a side elevational view showing the conveyor mechanism in a loading position with a roller conveyor section occurring in a horizontally extending position;

Fig. 3 is another side elevational view of the apparatus shown in Fig. 2, but further disclosing the conveyor section in an inclined conveying position;

Fig. 4 is a cross-section taken on the line 4—4 of Fig. 1;

Fig. 5 is a cross-section taken on the line 5—5 of Fig. 1; and

Fig. 6 is a cross-section taken on the line 6—6 of Fig. 1.

In general, the apparatus of the invention includes a stand for supporting a cash register in a raised position to constitute a checking-out station, in combination with a merchandise conveying device for intermittently moving merchandise toward and away from said checking station. The conveying device, as illustrated in the drawings and hereinafter described, is intended to illustrate the use of the invention in the preferred application of supermarket use. However, it should be understood that the conveyor device may be desired to be employed in various other merchandising connections and using various other register and checking-out devices.

Referring more in detail to the structure shown in the drawings, S denotes a stand for any suitable construction for supporting a cash register in a raised position to constitute, in effect, a part of the checking-out station. In accordance with the invention, I provide a special merchandise conveying device which extends outwardly in two directions from the checking-out station, and which is designed for use in intermittently moving merchandise toward and away from said checking-out station.

Considering the merchandise conveying device in more detail, numeral 2 denotes a frame which is supported in a raised, horizontally disposed position on legs 4, 6, 8 and 10 as shown, for example, in Fig. 2. The frame 2 may, in one suitable form, be constructed of angle iron sections welded or bolted together to comprise a relatively rigid structure which defines a rectangular enclosure, as is best shown in Fig. 1.

Within the rectangular enclosure referred to above, I mount a special multi-roller conveyor mechanism. This multi-roller conveyor mechanism includes rollers and a roller support 12 which is also of rectangular shape and which, as shown in Figs. 4, 5 and 6, is of a size slightly smaller than the rectangular enclosure of frame 2. The roller support is formed with an offset end 12a and an oppositely offset end 12b. The offset end 12a, together with retaining strip 11, defines a storage bin in which merchandise M and M1 may be placed and temporarily held. The offset end 12b, together with a retaining strip 13, form an abutment for preventing movement of merchandise beyond that point.

At either side of the roller support I provide pivot means 14 and 16 which are mounted in bearings as 18 located in opposite sides of the frame 2, as is best shown in Fig. 6. This arrangement allows the roller support to be moved from a horizontal position into an inclined position. It will be observed that the roller support may be turned about an axis of rotation which extends beyond the frame in spaced relation to the stand S to define an area in which an operator may stand and which may be conveniently referred to as an operator station.

Transversely disposed at spaced intervals along the roller support 12 are a plurality of rollers R which may consist of rubber covered steel cylinders, for example, and whose extremities are formed with reduced ends rotatively mounted in the vertical sides of the roller support 12 in bearings as 24, best shown in Fig. 5.

In the position shown in Figs. 5 and 6, it will be observed that the rollers R occur at a level slightly below the top surface of the frame 2 and, therefore, the merchandise carried along the rollers may be guided between the vertical sides of the roller support 12.

Secured to the upper side of the roller support 12 is a stop bar 26 which is located immediately above the axis of turning of the roller support member. The stop bar 26 is formed to project slightly above the roller elements, as noted in Fig. 4, in a position to receive and temporarily hold merchandise on the roller elements at a point just ahead of the cash register stand S and in close proximity to the operator's station. It will be observed, therefore, that the operator, when in the operator station described, is furnished with merchandise coming to rest at a point directly under his left hand, which can be used to pick up articles, while the amount is registered on the cash register with the right hand. The articles thus checked out may, without further change of position on the part of the operator, be placed on the other side of the stop bar 26 and carried away in a manner hereinafter described more in detail.

In addition to the apparatus described, I further provide means for mechanically moving the roller support and roller elements from a horizontal position into an inclined position at any desired point. One suitable means for carrying out this tilting movement is illustrated in Figs. 2 and 3, and includes, in one simple form, pivoted links 28 and 30 which are secured together by a pin 32. The link 28 is pivotally attached to the bottom of the roller support by means of a pivot pin 34, which extends through a lug portion 35. The link 30 is attached to the base of the frame 2 by a pin 36 passed through a lug portion 37.

In the horizontal position of the roller support and roller elements shown in Fig. 1, the links 28 and 30 are angularly disposed with respect to one another, being drawn into this position by a reciprocating plunger 40 operated, for example, by a hydraulic cylinder 42.

The fluid for cylinder 42 is conducted through conduits 44 and 46, through a valve control 48 located just ahead of the stand S and projecting slightly outwardly from the side of the frame 2, as is best shown in Fig. 1. Operation of this valve mechanism is carried out by means of a foot pedal P which occurs in a convenient position within the area of the operator station so that an operator may actuate the hydraulic cylinder by means of his foot without interrupting the operation of checking out merchandise.

In Fig. 3, the reciprocating plunger 40 is illustrated in an extended position, which results in the links 28 and 30 becoming straightened and, simultaneously, the roller support 12 is tilted into a forwardly inclined position. Thus, it will be seen that merchandise M, M1 may be placed by a customer in the storage bin shown at the left hand side of Fig. 2 and then advanced beyond the offset portion 12a. Thereafter, as roller support is tilted into the position shown in Fig. 3, forces of gravity act on the merchandise M, M1, and these items move forwardly on the rollers at a relatively slow, controlled rate of speed, which will avoid excessive jar or breakage as the items come to rest against the stop 26.

In a preferred form of the invention, I may also employ a second pivoted linkage and reciprocating plunger arrangement, as shown at the right hand side of Fig. 2 and operating in conjunction with the links 28 and 30. Numerals 50 and 52 denote links actuated by plunger 53 and cylinder 54. The link 50 is secured to the forward end of the roller support 12 and is controlled through fluid conduits 56 and 58 and a foot pedal 60. The link 52 is anchored in the bottom of the frame, as shown. It will be observed that when the links 28 and 30 are in a straightened position, the links 50 and 52 will be retracted as the roller support is moved into an inclined position. Similarly, the links 50 and 52 are straightened when the roller support is in a horizontal position.

It is pointed out that that portion of the roller support 12 occurring between the stop bar 26 and the retaining strip 13 not only constitutes a convenient means for carrying away items which have been checked out at the cash register, but also delivers these items to a portion normally referred to as a bagging station where another operator places the items in a paper bag or other container. By having the combined conveyor sections described, therefore, two operations may be carried out and either one of the operations may be controlled by raising or lowering the roller support, depending upon the amount of merchandise which is desired to be handled at any particular time.

From the foregoing description, it will be apparent that I have provided a simplified conveyor mechanism which is modified by forces of gravity and which delivers merchandise to the checking out station in a convenient manner and in such a position that once the items have been checked out, they may be disposed of and carried away to a bagging station without requiring the use of a separate clearing bar or electrically actuated control mechanism. The structure is designed for use with any type of checking out station where a cash register is employed and is particularly designed for use in limited space areas where a considerable volume of merchandise must be handled rapidly and efficiently.

Having thus described my invention, what I claim is:

1. Apparatus for use in checking out self-service merchandise in a supermarket, comprising, in combination, a cash register stand for supporting a cash register in a raised position to constitute a checking-out station, a merchandise conveying device for intermittently moving merchandise toward and away from said checking-out station, said conveying device including an elongated rectangularly shaped frame located closely adjacent to one side of the cash register stand and having its upper surface occurring in a horizontal position to support merchandise at approximately the level of the said stand, a gravity operated multi-roller conveyor unit comprising a roller support and spaced roller elements transversely mounted in the roller support for free rotative movement, said roller support being pivotally supported in the frame to provide for tilting the roller support from a horizontal position into an inclined position along an axis of turning which extends in spaced relation to the front of said cash register stand to define an operator station, a stop bar transversely secured between opposite sides of the roller support immediately above the said axis of turning, said stop bar projecting upwardly to receive and temporarily hold merchandise on the roller elements at a point just ahead of the cash register stand and in close proximity to the operator station, fluid cylinder operated mechanism for moving the roller support and roller elements through varying tilting angles in accordance with the size and weight of merchandise to be advanced along the conveyor.

2. A structure according to claim 1 in which the fluid cylinder operated mechanism for moving the roller support includes a pivoted linkage having one end thereof attached to the under side of the roller support and its other end attached to the base of said frame, and a reciprocating plunger device anchored in the base and connected to the pivoted linkage.

3. A structure according to claim 1 in which the roller support is offset at one end to define a merchandise retaining section when the roller support is in a horizontal position.

4. A structure according to claim 1 in which the mechanism for moving the roller support includes a foot control pedal projecting downwardly into the said operator section.

5. A structure according to claim 1 in which the merchandise conveying device includes a conveyor extension and a second stop bar for receiving merchandise from the checking-out station and holding it at a bag filling station.

6. A structure according to claim 1 in which the merchandise conveying device includes a conveyor station and a second stop bar for receiving merchandise from the checking-out station and holding it at a bag filling station, said roller support being offset at the end of the said conveyor station to restrict forward travel of merchandise beyond the bag filling station.

7. A structure according to claim 1 in which the mechanism for moving the roller support includes a set of operating linkages at one end of the frame and a second set of operating linkages at the opposite end of the frame.

References Cited in the file of this patent

UNITED STATES PATENTS

| 1,583,093 | Parker | May 4, 1926 |
| 1,626,933 | Hawkins | May 3, 1927 |
| 2,096,959 | Clerc | Oct. 26, 1937 |
| 2,556,399 | Sanger et al. | June 12, 1951 |
| 2,723,728 | Crawford | Nov. 15, 1955 |